(12) United States Patent
Chaillou

(10) Patent No.: US 12,017,896 B2
(45) Date of Patent: Jun. 25, 2024

(54) LIFTING MACHINE IN PARTICULAR FOR HANDLING LOADS

(71) Applicant: MANITOU BF, Ancenis (FR)

(72) Inventor: Vincent Chaillou, Ancenis (FR)

(73) Assignee: MANITOU BF, Ancenis (FR)

( * ) Notice: Subject to any disclaimer, the term of this patent is extended or adjusted under 35 U.S.C. 154(b) by 663 days.

(21) Appl. No.: 17/269,528

(22) PCT Filed: Aug. 30, 2019

(86) PCT No.: PCT/FR2019/052000
§ 371 (c)(1),
(2) Date: Feb. 18, 2021

(87) PCT Pub. No.: WO2020/043992
PCT Pub. Date: Mar. 5, 2020

(65) Prior Publication Data
US 2021/0179406 A1      Jun. 17, 2021

(30) Foreign Application Priority Data
Aug. 31, 2018 (FR) ...................................... 18 57867

(51) Int. Cl.
*B66F 9/075* (2006.01)
*B60G 9/02* (2006.01)
(Continued)

(52) U.S. Cl.
CPC ............ *B66F 9/07586* (2013.01); *B60G 9/02* (2013.01); *B60G 13/08* (2013.01);
(Continued)

(58) Field of Classification Search
CPC .......... B60G 9/02; B60G 13/08; B60G 13/14; B60G 17/0152; B60G 17/016;
(Continued)

(56) References Cited

U.S. PATENT DOCUMENTS

| 3,937,339 A | 2/1976 | Geis et al. | |
| 4,393,959 A * | 7/1983 | Acker ................... | B60G 17/005 |
| | | | 280/124.112 |

(Continued)

FOREIGN PATENT DOCUMENTS

| DE | 102014113998 | 3/2016 | |
| DE | 102014113998 A1 * | 3/2016 | ........... B60G 17/005 |

OTHER PUBLICATIONS

International Search Report dated Nov. 29, 2019.
Search Report dated Jun. 24, 2019.

*Primary Examiner* — Saul Rodriguez
*Assistant Examiner* — Brendan P Tighe
(74) *Attorney, Agent, or Firm* — IPSILON USA, LLP

(57) ABSTRACT

The invention relates to a lifting machine (1) comprising a lifting arm (3), a rolling chassis (2) equipped with at least one front axle (5) and one rear axle (6), and a sensor for measuring the tilt of the lifting arm (3) in relation to the chassis (2), the rear axle (6) being pivotably mounted around an axis that is parallel to the longitudinal axis of the machine (1). The rear pivoting axle (6) is mounted to freely pivot inside an angular range defined by two abutments supported by said chassis (2), the front axle (5) is coupled to the chassis (2) by a pivoting connection with an axis that is parallel to the longitudinal axis of the machine (1) and is equipped with an activatable/deactivatable suspension (9) in order to allow the relative pivoting between the front axle (5) and the chassis (2) to be damped, said suspension (9) being deactivated at least when the angle value measured by sensor (4) for measuring the tilt of the lifting arm (3) is greater than a predetermined threshold value.

10 Claims, 8 Drawing Sheets

(51) Int. Cl.
*B60G 13/08* (2006.01)
*B60G 17/015* (2006.01)
*B60G 17/016* (2006.01)
*B60G 17/08* (2006.01)
*B66F 9/065* (2006.01)
*F15B 15/08* (2006.01)
*B60G 13/14* (2006.01)

(52) U.S. Cl.
CPC ....... *B60G 17/0152* (2013.01); *B60G 17/016* (2013.01); *B60G 17/08* (2013.01); *B66F 9/0655* (2013.01); *B66F 9/07513* (2013.01); *B66F 9/0759* (2013.01); *F15B 15/08* (2013.01); *B60G 13/14* (2013.01); *B60G 2200/322* (2013.01); *B60G 2200/326* (2013.01); *B60G 2202/24* (2013.01); *B60G 2202/413* (2013.01); *B60G 2204/45* (2013.01); *B60G 2204/62* (2013.01); *B60G 2300/022* (2013.01); *B60G 2400/0516* (2013.01); *B60G 2400/204* (2013.01); *B60G 2400/41* (2013.01); *B60G 2400/90* (2013.01); *B60G 2500/00* (2013.01); *B60G 2600/182* (2013.01); *F15B 2201/00* (2013.01)

(58) Field of Classification Search
CPC ............. B60G 17/08; B60G 2200/322; B60G 2200/326; B60G 2202/24; B60G 2202/413; B60G 2204/45; B60G 2204/62; B60G 2300/022; B60G 2400/0516; B60G 2400/204; B60G 2400/41; B60G 2400/90; B60G 2500/00; B60G 2600/182; B66F 9/0655; B66F 9/07513; B66F 9/07586; B66F 9/0759; F15B 15/08
See application file for complete search history.

(56) References Cited

U.S. PATENT DOCUMENTS

| | | | | |
|---|---|---|---|---|
| 4,705,295 | A | * 11/1987 | Fought | B60G 21/106 |
| | | | | 212/301 |
| 5,813,697 | A | 9/1998 | Bargenquast et al. | |
| 5,947,516 | A | * 9/1999 | Ishikawa | B60G 17/005 |
| | | | | 280/755 |
| 5,997,013 | A | * 12/1999 | Claxton | B60P 1/045 |
| | | | | 280/124.112 |
| 6,131,918 | A | * 10/2000 | Chino | B60G 17/005 |
| | | | | 280/124.112 |
| 2006/0232025 | A1 | * 10/2006 | Braud | B66F 9/07586 |
| | | | | 280/6.16 |
| 2012/0321422 | A1 | 12/2012 | Borghi | |

\* cited by examiner

LIFTING MACHINE IN PARTICULAR FOR HANDLING LOADS

RELATED APPLICATION

This application is a National Phase of PCT/FR2019/052000 filed on Aug. 30, 2019, which claims the benefit of priority from French Patent Application No. 18 57867, filed on Aug. 31, 2018, the entirety of which are incorporated by reference.

FIELD OF THE INVENTION

The invention relates to a lifting machine in particular for handling loads.

More specifically, the invention relates to a lifting machine comprising a chassis, a lifting arm that is mounted on said chassis and is moveable at least pivotingly between a high position and a low position, at least one sensor for measuring the inclination of the lifting arm in relation to the chassis, said chassis being a rolling chassis fitted with at least one front axle and one rear axle, the rear axle being mounted pivotingly about an axis parallel to the longitudinal axis of the machine, in which at least one of the axles is a suspended axle fitted with a suspension assembly.

DESCRIPTION OF RELATED ART

Such lifting machines are used on uneven terrain. This results in a rolling movement of the chassis in relation to the ground. This rolling is uncomfortable for the driver. To dampen this rolling, it is known to mount the driver's cab on shock absorbers. However, this solution is costly. It is also known to fit the machine with a single oscillating axle that is free to pivot, as shown in patent U.S. Pat. No. 5,813,697.

OBJECTS AND SUMMARY

One purpose of the invention is to propose a lifting machine designed to improve driving comfort for the driver without compromising the safety of the machine.

For this purpose, the invention relates to a lifting machine comprising a chassis, a lifting arm that is mounted on said chassis and is moveable at least pivotingly between a high position and a low position, at least one sensor for measuring the inclination of the lifting arm in relation to the chassis, said chassis being a rolling chassis fitted with at least one front axle and one rear axle, the rear axle being mounted pivotingly about an axis parallel to the longitudinal axis of the machine, in which at least one of the axles is fitted with a suspension assembly, characterized in that the pivoting rear axle is free to pivot within an angular range delimited by two stops carried on said chassis, in that the front axle is coupled to the chassis by a pivot link with an axis parallel to the longitudinal axis of the machine, in that the suspension assembly is fitted to the front axle to damp the relative pivoting between the front axle and the chassis, in that said suspension assembly is an activatable/deactivatable suspension assembly, and in that said suspension assembly is deactivated at least when the angular value measured by the sensor for measuring the inclination of the lifting arm is greater than a predetermined threshold value.

The provision of two oscillating axles and the option of deactivating the suspension assembly of one of the axles under specific conditions increases driving comfort without adversely affecting the safety of the machine. This design enables two freely pivoting oscillating axles to be used under certain conditions without adversely affecting the safety of the driver of the machine.

According to one embodiment of the invention, the pivoting rear axle is permanently free to pivot.

According to one embodiment of the invention, the machine has at least one configuration in which the pivoting rear axle is free to pivot and the suspension assembly fitted to the front axle is in the activated state to enable the front axle to pivot freely. Thus, with the suspension assembly in the activated state, the two axles are free to pivot, thereby optimizing driving comfort without adversely affecting the safety of the machine.

According to one embodiment of the invention, the machine includes a member for activating/deactivating the suspension assembly that is actuated by the driver of the machine.

According to one embodiment of the invention, the machine includes a control unit that is configured to command the activation or deactivation of the suspension assembly at least as a function of the data provided by the sensor for measuring the inclination of the lifting arm.

According to one embodiment of the invention, the suspension assembly of the front axle has at least one hydraulic actuator arranged between the front axle and the chassis that links the front axle to the chassis, one or more shock absorbers and at least one closable fluid link between the actuator and the shock absorber or shock absorbers, said suspension assembly being deactivated when the fluid link is in the closed state.

According to one embodiment of the invention, the control unit and/or the member for activating/deactivating the suspension assembly actuated by the driver of the machine are configured to command the activation of the suspension assembly by opening the fluid link and the deactivation of the suspension assembly by closing the fluid link.

According to one embodiment of the invention, the machine includes a device for controlling the actuator comprising a control member for the actuator actuated by the driver of the machine and the control unit is configured to command the deactivation of the suspension assembly when the member for controlling the actuator actuated by the driver of the machine is in the actuated state. This enables said actuator to provide a slope-correction function.

According to one embodiment of the invention, the device for controlling the actuator includes a hydraulic distributor interposed between a pressurized-fluid feed source and the actuator, said distributor being moveable between positions including at least one position in which no fluid is being fed to the actuator and positions in which fluid is being fed to the actuator, said distributor being in a position feeding fluid to the actuator, when the member for controlling the actuator actuated by the driver of the machine is in the actuated state.

According to one embodiment of the invention, the chassis includes a driving cab fitted with a floor, the machine has a sensor for measuring the angle formed between the plane of the floor and the longitudinal axis of the front axle of the chassis, and the control unit is configured, when the suspension assembly is in the deactivated state and the member for controlling the device for controlling the actuator is in the non-actuated state, to prevent the activation of the suspension assembly at least while the angle measured by the sensor for measuring the angle formed between the plane of the floor and the longitudinal axis of the front axle of the chassis is outside a predetermined angular range. This obviates any risk of increasing the lateral instability of the machine under these conditions.

According to one embodiment of the invention, the actuator is formed by one dual-action hydraulic cylinder or two single-action hydraulic cylinders, each of which is arranged between the front axle and the chassis, the or each cylinder of the actuator has a body and a rod that is mounted slidingly inside the body and that divides the body into two chambers, and the rod of the or each cylinder is free to slide inside said body of the associated cylinder when the closable fluid link between the actuator and the shock absorber or shock absorbers is in the open state.

According to one embodiment of the invention, the or at least one shock absorber, and preferably each of the shock absorbers, is formed by a returnable energy accumulator, such as a hydraulic or hydropneumatic accumulator, in particular a bladder- or piston- or membrane-accumulator.

BRIEF DESCRIPTION OF DRAWINGS

According to one embodiment of the invention, the machine has a sensor for measuring the movement speed of the machine and a sensor for measuring the steering angle of the wheels of the front axle, and the control unit is configured to command the deactivation of the suspension assembly at least as a function of the data provided by said sensors.

The invention is detailed in the description of example embodiments provided below with reference to the attached drawings, in which.

DETAILED DESCRIPTION

Figure 1A:
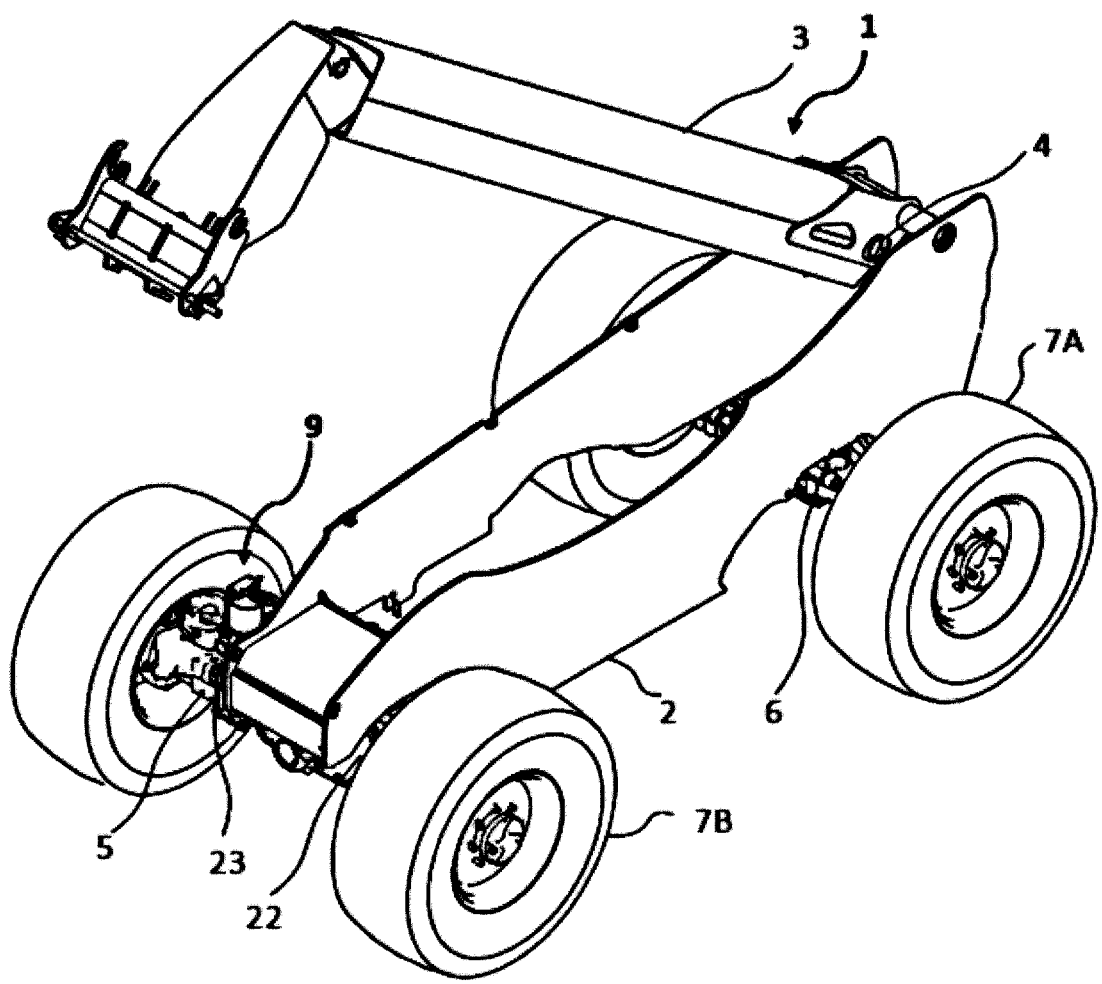
FIG. 1A is a partial perspective schematic view of a lifting machine according to the invention.
Figure 1B:
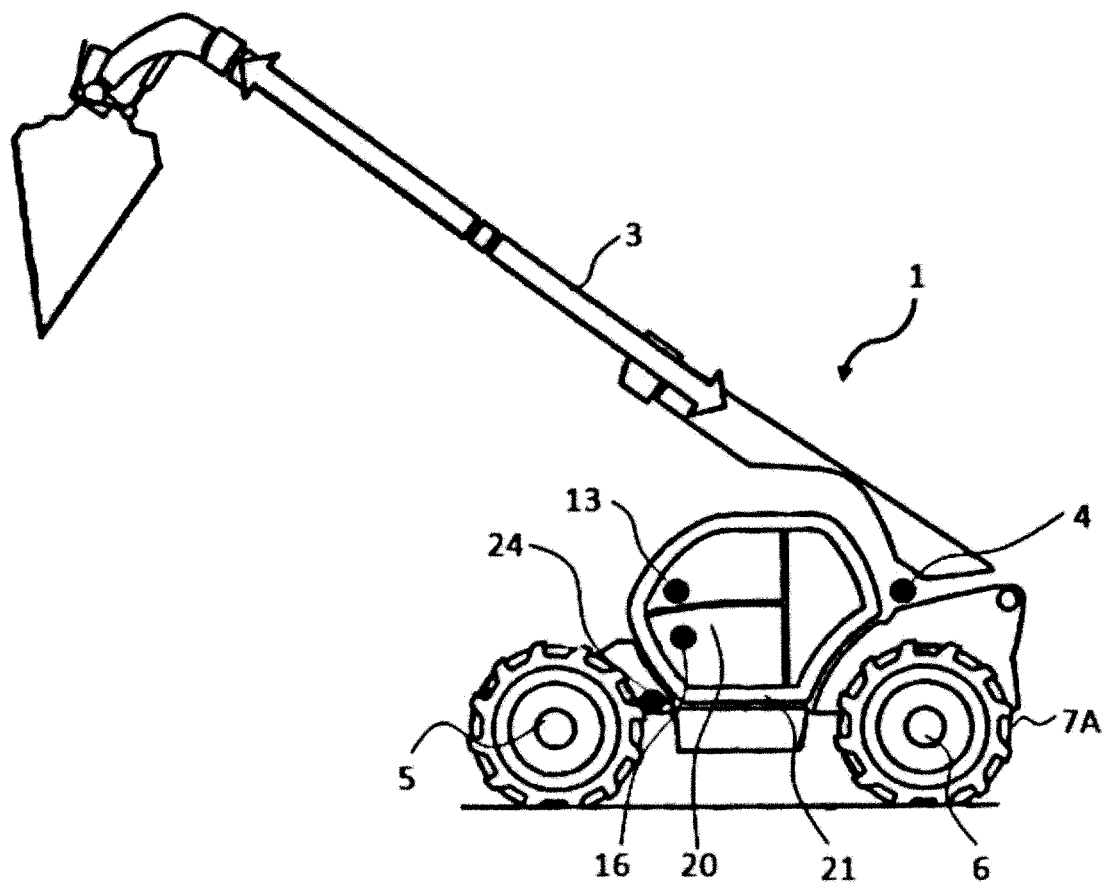
FIG. 1B is a schematic perspective view of a lifting machine according to the invention, showing the driving cab.
Figure 2:
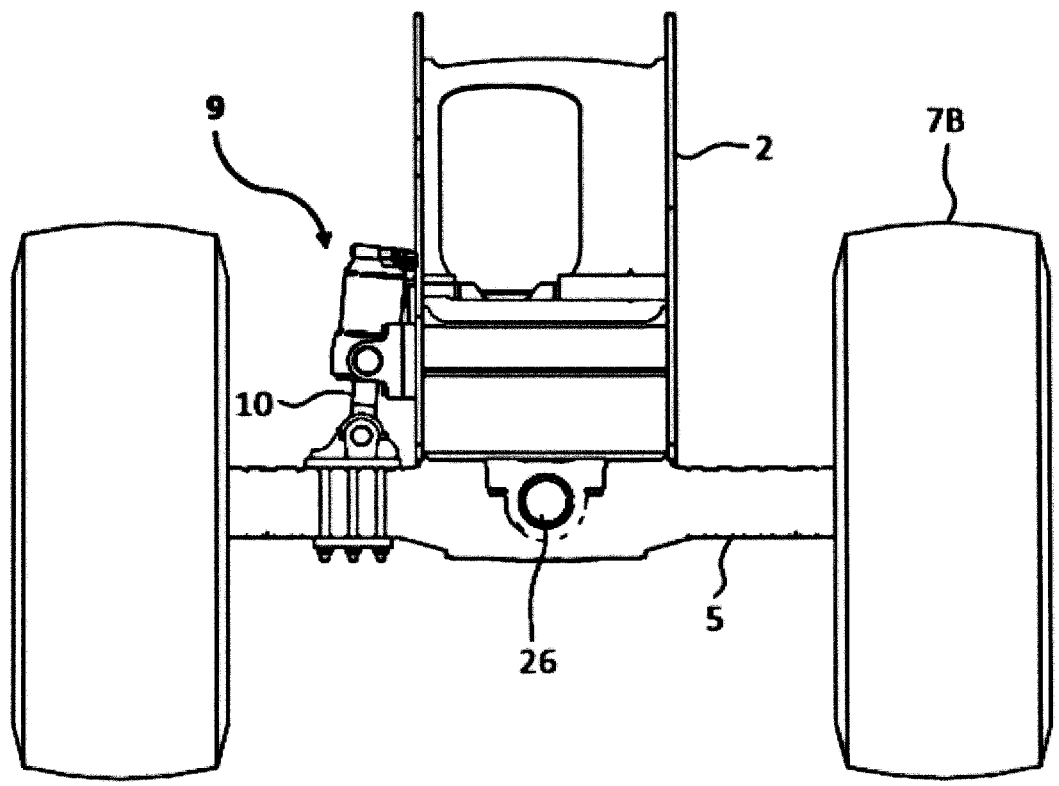
FIG. 2 is a partial schematic view of the front axle of a lifting machine according to the invention.

As mentioned above, the lifting machine 1 is more specifically designed to enable the handling of loads. This machine 1 has a chassis 2 carrying a lifting arm 3. This lifting arm 3 can be a telescopic arm. The lifting arm 3 is usually fitted with a load-handling tool, such as a bucket, forks or another accessory, at the free end thereof. This lifting arm 3 is coupled pivotingly to the chassis 2 to move the lifting arm 3 between a high position and a low position. For this purpose, one or more actuators, such as cylinders (not shown), are provided between the lifting arm and the chassis 2 in a known manner, the pivoting occurring about a horizontal axis, i.e. an axis substantially parallel to the plane of the ground when the machine is resting on a horizontal plane.

This lifting arm 3 extends in the front/rear direction of the chassis 2, with the free end thereof positioned beyond the front end of the chassis when the lifting arm 3 is in the low position. The pivot link linking the lifting arm 3 to the chassis 2 is therefore closer to the rear of the machine than the front of the machine 1.

The machine 1 also has a sensor 4 for measuring the inclination of the lifting arm 3 in relation to the chassis 2.

The chassis 2 of the machine has a driving cab 20 inside which a driver of the machine can sit. In the example shown, when the lifting arm 3 is in the low position, the arm rests on a portion of the chassis 2 beside the driving cab 20.

The chassis 2 of the machine is a rolling chassis fitted with a front axle 5 and a rear axle 6. The pivot link coupling the lifting arm 3 to the chassis is therefore closer to the rear axle 6 than the front axle 5.

Figure 3:
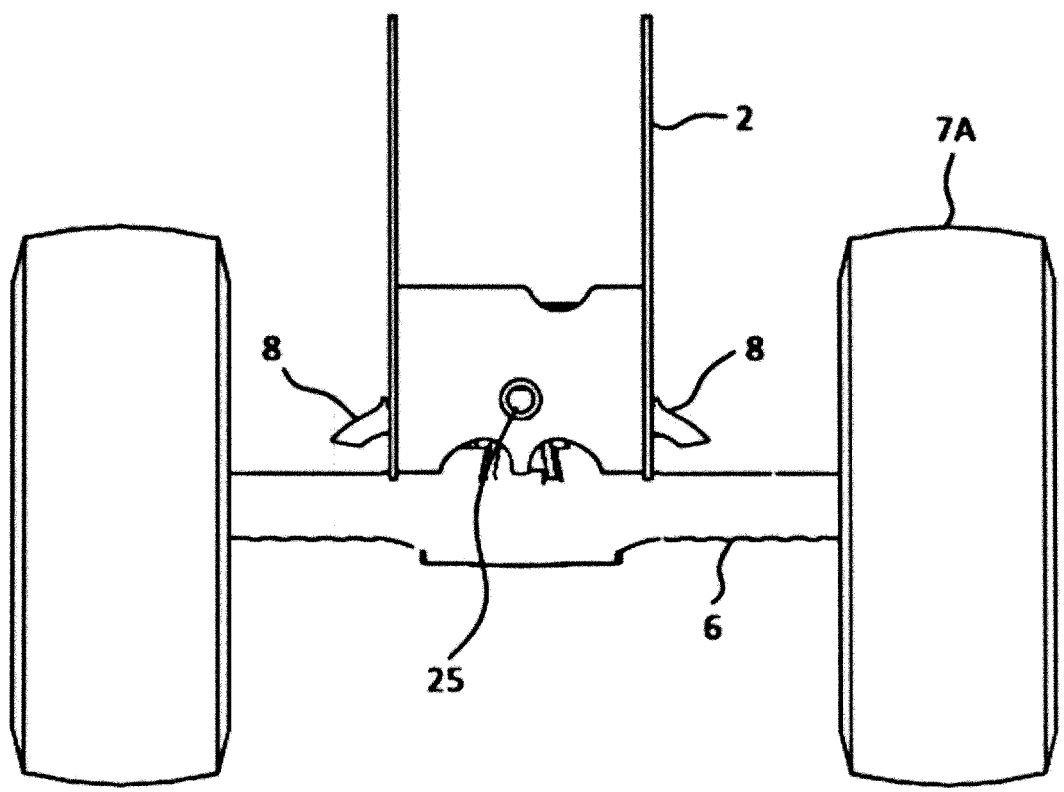
FIG. 3 is a partial schematic view of the rear axle of a lifting machine according to the invention.

Each axle is fitted with wheels, indicated using reference sign 7B for the front axle 5 and 7A for the rear axle 6. The rear axle 6 is a pivoting axle. The pivoting rear axle 6 is coupled to the chassis by a pivot link, the axis of which is indicated using reference sign 25 in FIG. 3. This axis extends parallel to the horizontal longitudinal axis of the chassis of the machine when the machine is positioned on the flat or parallel to the front/rear direction of the machine. This rear axle 6 is free to pivot within an angular range determined by two stops 8 that are carried by said chassis 2 and that lie on said chassis on either side of the pivoting link 25 coupling the rear axle 6 to the chassis 2 above said link.

In the examples shown, the pivoting rear axle 6 is permanently free to pivot, i.e. there are no blocking means affecting the pivot link between the rear axle and the chassis.

Thus, one of the stops 8 delimits the movement of the rear axle 6 in the direction of an upwards movement of the left rear wheel of the machine, while the other stop 8 limits the pivoting movement of the rear axle 6 in the direction of an upwards movement of the right rear wheel of the machine.

The front axle 5 is also an oscillating axle coupled to the chassis by a pivot link 26 with a pivot axis parallel to the longitudinal axis of the machine 1. The provision of an oscillating or pivoting axle enables the wheels of the machine to better follow the profile of the ground, in particular in the case of uneven ground.

This front axle 5 is provided with a suspension assembly 9 to damp the pivoting movements of the front axle 5 in relation to the chassis 2. This suspension assembly 9 is an activatable/deactivatable suspension assembly.

In the examples shown, this suspension assembly 9 of the front axle 5 includes a hydraulic actuator 10 arranged between the front axle 5 and the chassis 2 linking the front axle 5 to the chassis 2, shock absorbers 11 and a closable fluid link 12 between the actuator 10 and the shock absorbers 11, the suspension assembly 9 being deactivated when the fluid link 12 is in the closed state.

Figure 4:
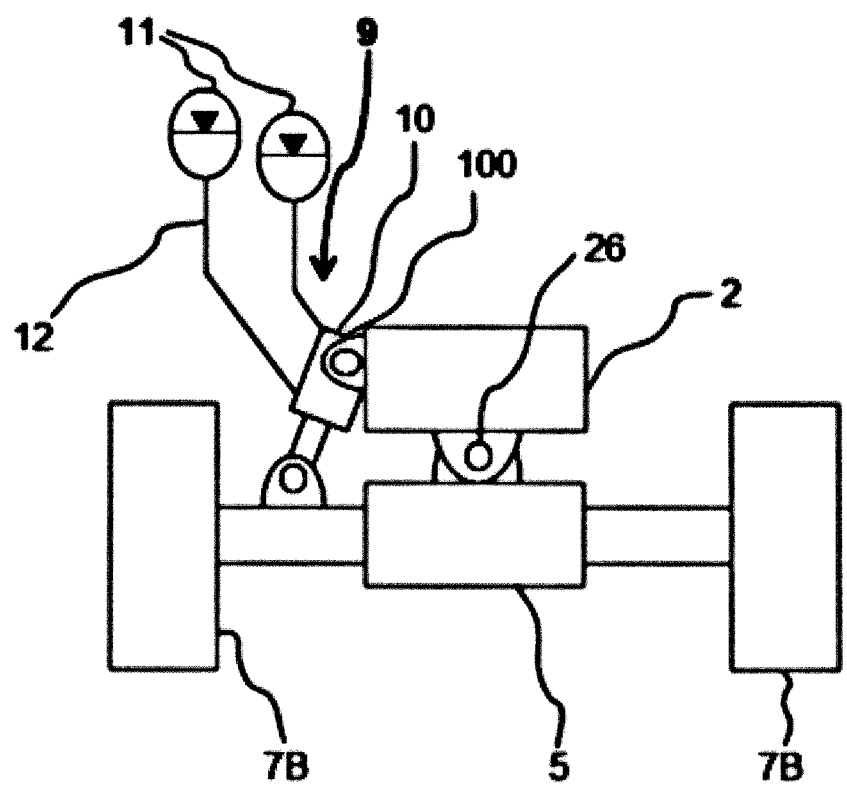
FIG. 4 is a partial schematic view of the front axle of a lifting machine according to the invention, in which the actuator is a dual-action cylinder.
Figure 5:
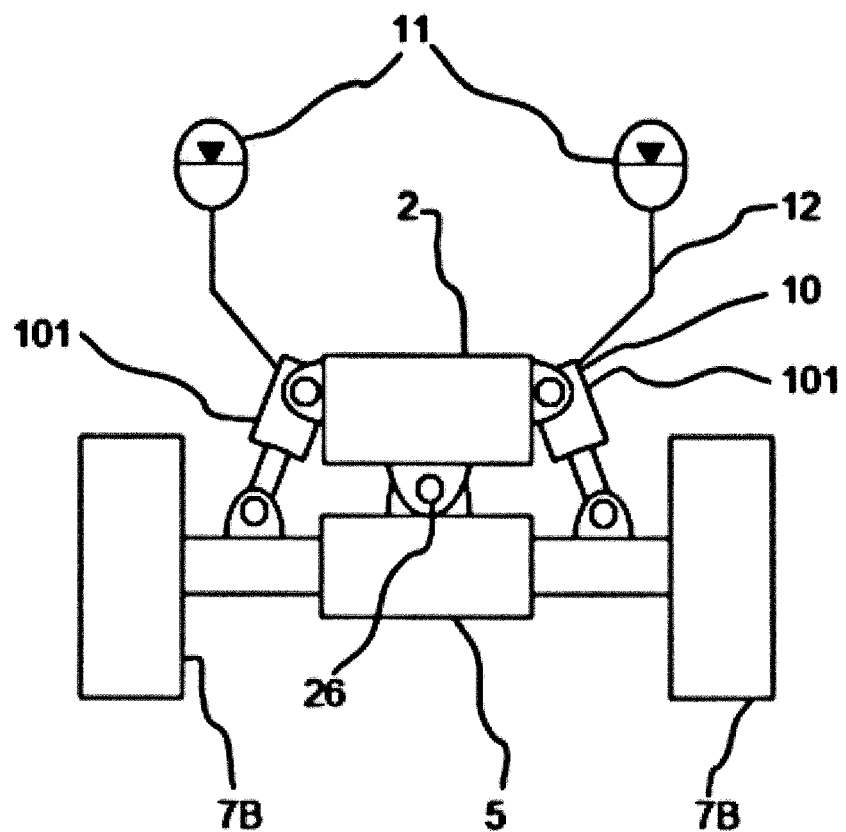
FIG. 5 is a partial schematic view of the front axle of a lifting machine according to the invention, in which the actuator comprises two single-action cylinders.
Figure 6:
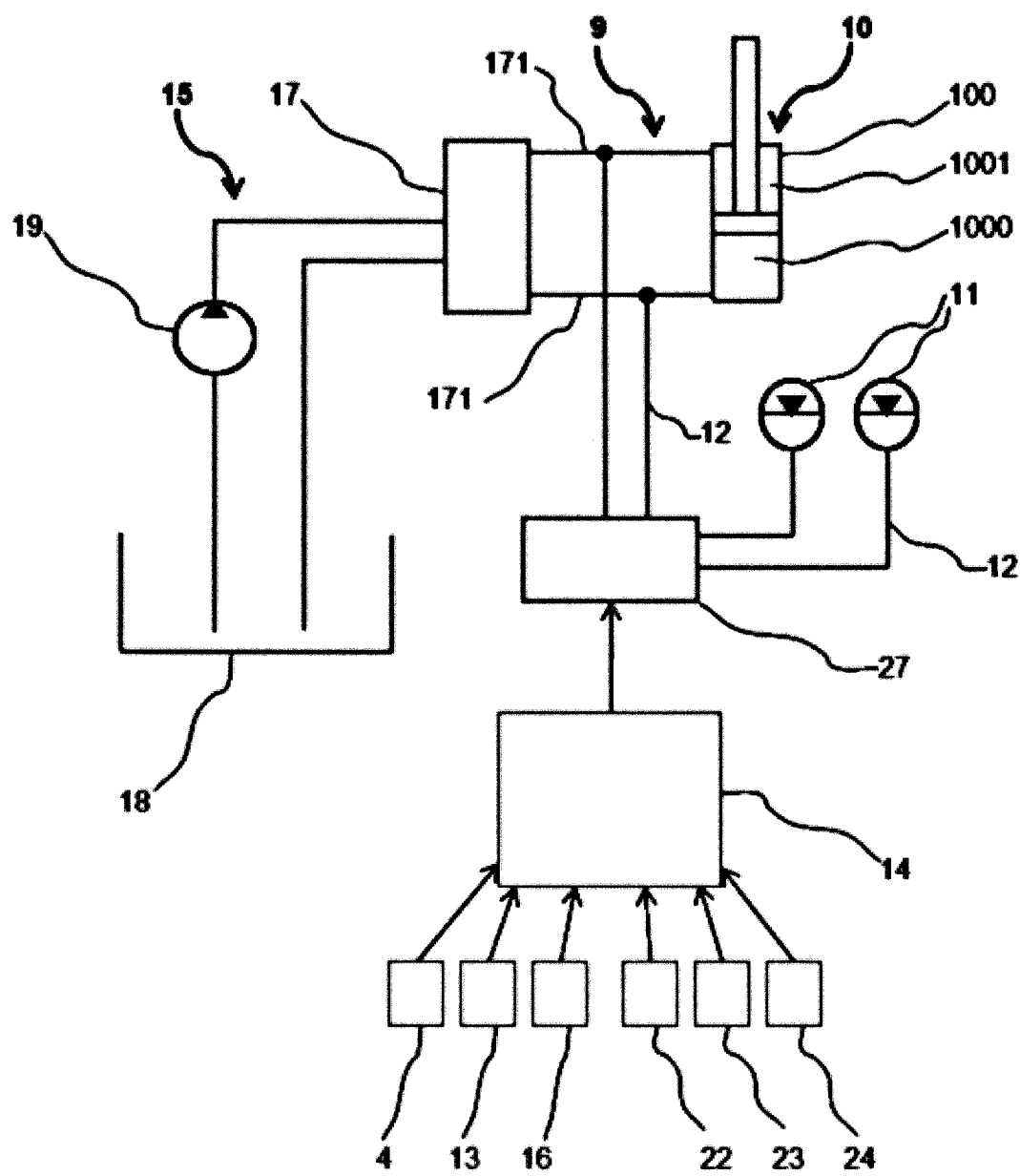
FIG. 6 is a simplified schematic view of the suspension assembly and of the control unit of a lifting machine according to the invention, in which the actuator of the suspension assembly is a dual-action cylinder.
Figure 7:
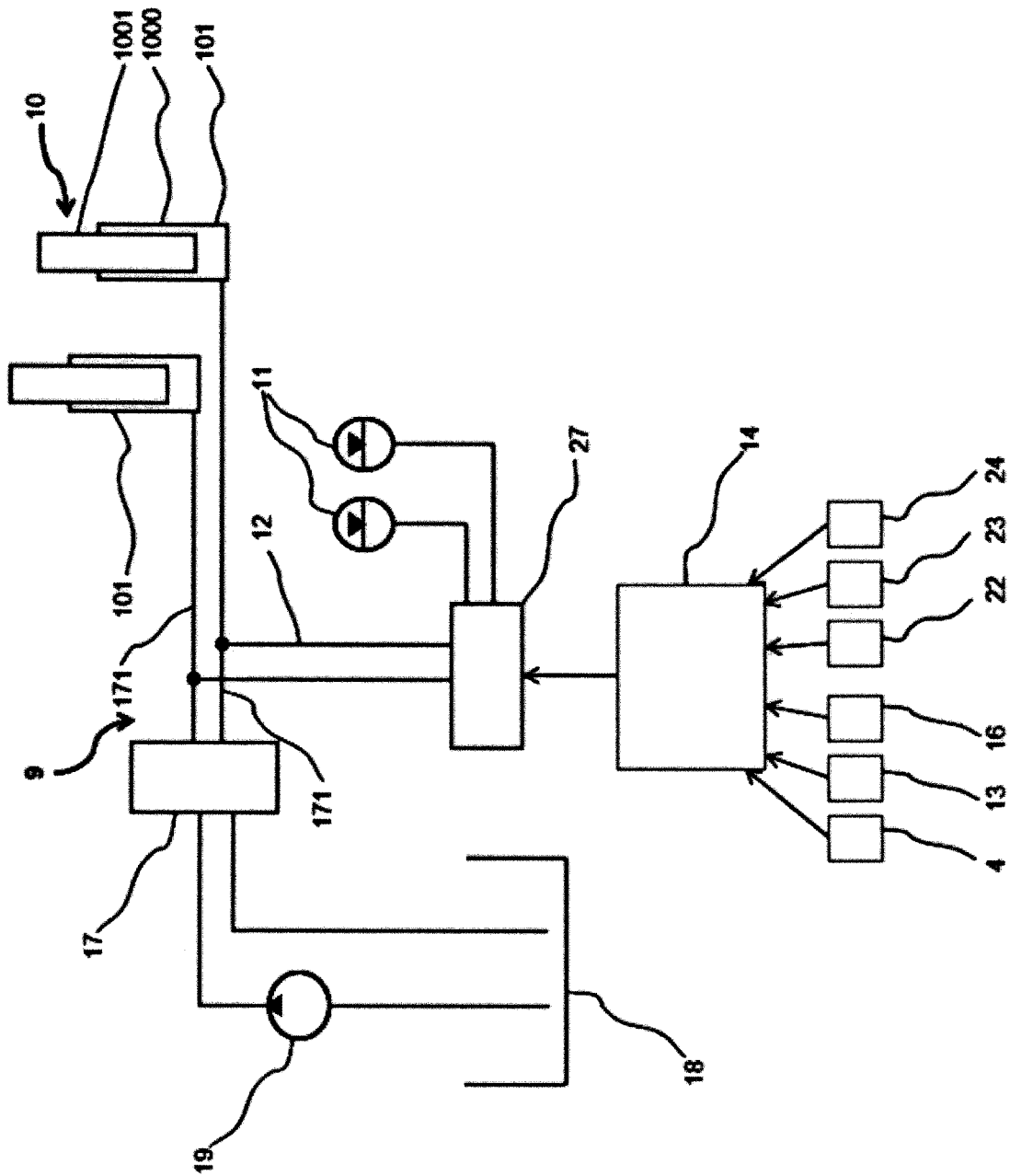
FIG. 7 is a simplified schematic view of the suspension assembly and of the control unit of a lifting machine according to the invention, in which the actuator of the suspension assembly comprises two single-action cylinders.

The actuator 10 can be a dual-action hydraulic cylinder 100, as shown in FIGS. 4 and 6, or two single-action hydraulic cylinders 101, each of which is arranged between the front axle 5 and the chassis 2 on either side of the pivot link 26, as shown in FIGS. 5 and 7.

Regardless of whether single- or dual-action cylinders are used, this cylinder includes a body 1000 and a rod 1001 that is mounted slidingly inside the body 1000 and that divides the body 1000 into two chambers. Thus, the rod 1001 is coupled to the chassis 2 and the body 1000 to the front axle 5, or vice versa. The actuator 10 is therefore liable to be stressed during a relative pivoting movement of the front axle and of the chassis 2.

Each of the shock absorbers 11 is a returnable energy accumulator, such as a hydraulic or hydropneumatic accumulator, in particular a bladder- or piston- or membrane-accumulator, or similar.

These shock absorbers 11 are either arranged with one shock absorber linked to the chamber of one of the cylinders and the other shock absorber linked to the chamber of the other cylinder, where the actuator is an actuator comprising two single-action cylinders 101, as in the example shown in FIG. 7, or with one shock absorber linked to one of the chambers and the other shock absorber linked to the other chamber of the cylinder where the actuator is a dual-action cylinder 100, as in the example shown in FIG. 6.

Where necessary, each shock absorber 11 enables a pressurized fluid coming from the actuator 10 to be stored and subsequently returned. The operation of such accumulators is not described in detail since this is well known to the person skilled in the art.

Thus, one of the shock absorbers enables damping when the front axle 5 pivots in a direction corresponding for example to an upwards movement of the front left wheel, while the other shock absorber enables damping when the front axle 5 pivots in a direction corresponding for example to an upwards movement of the front right wheel.

The fluid link linking these shock absorbers 11 to the actuator 10 is indicated using reference sign 12 in the figures. This fluid link 12 has two fluid circulation lines in which, in the case of a dual action cylinder, one of the fluid circulation lines links one chamber of said cylinder to one of the accumulators and the other fluid circulation line links the other chamber of the cylinder to the other accumulator or, in the case of two single-action cylinders, one of the fluid circulation lines links the active chamber of one of the cylinders to one of the accumulators and the other fluid circulation line links the active chamber of the other cylinder to the other accumulator.

This link 12 can be closed by a closing system 27 that enables a simultaneous closing of both lines of the fluid link 12. In the examples shown, this closing system 27 comprises a distributor that in one of the positions thereof closes these two lines and in the other position thereof opens the two lines to form the fluid link 12 between the accumulators and the actuator. In a variant, this closing system 27 can be replaced by two synchronized-action solenoid valves arranged on each of the lines of the fluid link 12.

When the closable fluid link 12 is in the open state, the rod 1001 of the cylinder (in the case of a dual-action cylinder) or of each cylinder (in the case of two single-action cylinders) is free to slide inside the body of the related cylinder such that, when the cylinder is stressed by the relative pivoting movement between the chassis and the front axle, some of the fluid contained in the cylinder is transferred to the related accumulator, thereby damping the relative pivoting movement of the front axle and of the chassis 2. Thus, when the suspension assembly 9 is in the activated state, the front and rear axles can be arranged to pivot freely.

To deactivate the suspension assembly 9 and prevent such damping, the fluid link 12 need simply be closed.

According to a feature of the invention, the suspension assembly is deactivated at least when the angle value measured by the sensor 4 for measuring the inclination of the lifting arm 3 is greater than a predetermined threshold value.

For this purpose, the machine 1 includes a control unit 14 that is configured to command the activation or deactivation of the suspension assembly 9 at least as a function of the data provided by the sensor 4 for measuring the inclination of the lifting arm 3.

This control unit 4 is an electronic and/or computer system that for example includes a microprocessor and a working memory. According to a specific aspect, the control unit can be a PLC.

In other words, the described functions and steps can be implemented in the form of a computer program or using hardware components (such as programmable gate arrays). In particular, the functions and steps carried out by the control unit or the modules thereof can be carried out using sets of instructions or computer modules implemented in a processor or controller, or carried out by dedicated electronic components or FPGA or ASIC components. Computer components and electronic components can also be combined.

Where it is specified that the unit or means or modules of said unit are configured to carry out a given operation, this means that the unit has computer instructions and corresponding execution means enabling said operation to be carried out and/or that the unit includes the corresponding electronic components.

The machine can also include a member 13 for activating/deactivating the suspension assembly 9 that is actuated by the driver of the machine 1.

This activation/deactivation member 13 can be formed by a single control button arranged on the dashboard of the machine or on a control member, such as a joystick, arranged inside the cab 20 of the machine, enabling actuation of the lifting arm 3 and forward movement of the machine 1.

The control unit 14 and/or the member 13 for activating/deactivating the suspension assembly 9 actuated by the driver of the machine are configured to command the activation of the suspension assembly 9 by opening the fluid link 12 and the deactivation of the suspension assembly 9 by closing the fluid link 12. In other words, the control unit 14 and/or the member 13 for activating/deactivating the suspension assembly 9 actuated by the driver of the machine are configured such that the fluid link 12 is open when the suspension assembly 9 is in the activated state, and the fluid link 12 is closed when the suspension assembly 9 is in the deactivated state.

To perfect operation of the machine, and notably to enable a correction of the slope by modifying the relative pivoting position of the chassis and the front axle, when the suspension assembly is in the deactivated state, the machine 1 includes a device 15 for controlling the actuator 10 described above.

This control device 15 enables operational control of the cylinder or cylinders making up the actuator 10, specifically extending or retracting the rods of the cylinder or cylinders making up the actuator 10.

This device 15 for controlling the actuator 10 comprises a member 16 for controlling the actuator 10 that is actuated by the driver of the machine. This control member 16 is arranged inside the driving cab of the machine and can be a lever or the like.

When this member 16 for controlling the actuator 10 is in the actuated state, the control unit 14 is configured to command the deactivation of the suspension assembly 9, i.e. to close the fluid link 12 if the suspension assembly 9 had previously been activated.

The control device 15 also includes a hydraulic distributor 17 interposed between a pressurized-fluid feed source 18 and the actuator 10, said distributor 17 being moveable between positions including at least one position in which no fluid is being fed to the actuator and positions in which fluid is being fed to the actuator 10, said distributor 17 being in a position feeding fluid to the actuator 10, when the member 16 for controlling the actuator 10 actuated by the driver of the machine is in the actuated state.

This hydraulic distributor 17 thus enables the retraction or the extension of the rod of the cylinder or cylinders forming the actuator 10 as required by the driver of the machine.

Controlling this actuator 10 causes a relative pivoting movement of the front axle 5 and of the chassis 2 to the positioned desired by the driver of the machine.

The source 18 of the pressurized-fluid feed is in this case a fluid tank and a pump 19 that are arranged on one of the fluid links linking the tank to the hydraulic distributor 17.

This hydraulic distributor 17 then feeds the actuator 10 via a fluid link, indicated using reference sign 171 in the figures. This fluid link can coincide partially with the fluid link 12 linking the actuator 10 to the accumulators 11, it being understood that the hydraulic distributor 17 is in the closed position, i.e. with no fluid being fed to the actuator 10, when the fluid link 12 is open to prevent a fluid flowing between the actuator 10 and the shock absorbers or accumulators 11 from leaking into the tank of the pressurized-fluid feed source 18 via the hydraulic distributor 17 when the suspension assembly is in the activated state, i.e. when said fluid link 12 is open.

Similarly, when the hydraulic distributor 17 is in the position feeding fluid to the actuator 10, the fluid link 12 is closed to prevent the hydraulic fluid intended to feed the actuator 10 from leaking into the accumulators 11.

It should again be noted that the fluid link 171 between the hydraulic distributor 17 and the actuator 10 is formed by two lines, one of which is used to feed one of the chambers of the cylinder in the case of an actuator formed by a dual-action cylinder, or one of the chambers of the first single-action cylinder in the case of an actuator formed by two single-action cylinders, the other line being used to feed the other of the chambers of the dual-action cylinder or to feed one of the chambers of the second single-action cylinder.

The fluid feed to the actuator 10 via the hydraulic distributor 17 controlled using the member 16 for controlling the actuator 10 therefore occurs when the suspension assembly is in the deactivated state, this deactivation occurring once the control member 16 is initially actuated by the driver of the machine.

Other operating conditions can also trigger deactivation of the suspension assembly 9. Thus, the machine 1 has a sensor 24 for measuring the movement speed of the machine and a sensor 23 for measuring the steering angle of the wheels of the front axle 5, and the control unit 14 is configured to command the deactivation of the suspension assembly 9 at least as a function of the data provided by said sensors 23, 24.

This deactivation occurs when the speed of forward movement and the turning circle are too great, creating a risk of lateral instability of the machine.

Finally, the driving cab 20 of the machine is fitted with a floor 21, and the machine 1 has a sensor 22 for measuring the angle formed between the plane of the floor 21 and the longitudinal axis of the front axle 5 of the chassis 2. The angle can therefore be measured directly or indirectly. When the suspension assembly 9 is in the deactivated state and the member 16 for controlling the device 15 for controlling the actuator 10 is in the non-actuated state, the control unit 14 is configured to prevent activation of the suspension assembly 9 at least while the angle measured by the sensor 22 for measuring the angle formed between the plane of the floor 21 and the longitudinal axis of the front axle 5 of the chassis 2 is outside a predetermined angular range.

Activation of the suspension assembly can therefore be refused, including when requested by the driver of the machine by actuation of the activation/deactivation member 13, if the activation conditions that would enable safe operation of the machine are not met.

In practice, the machine can operate as follows:

The lifting arm is lowered, and the driver of the machine actuates the member 13 for activating/deactivating the suspension assembly 9. If the conditions so permit, the suspension assembly 9 is activated by the opening of the fluid link 12 between the actuator 10 and the accumulators 11.

If the driver of the machine lifts the lifting arm and the value of the angle measured by the sensor 4 for measuring the inclination of the lifting arm is greater than a predetermined threshold value, the suspension assembly is automatically deactivated by closure of the fluid link 12 between the actuator and the accumulator.

In this state, the driver of the machine can decide to vary the angle formed between the front axle and the chassis 2 by actuating the member 16 for controlling the actuator 10.

Once the arm has been lowered, the control unit 14 can command the automatic activation of the suspension assembly by opening of the fluid link 12 if the member 16 for controlling the actuator 10 is not actuated and if the other safe operating conditions of the machine have been met. This activation can also occur if the angle measured between the floor 21 and the longitudinal axis of the front axle of the chassis 2 is within a predetermined angular range.

Naturally, other activation/deactivation conditions for the suspension assembly 9 using sensors or actuators linked to the control unit 14 can be used without thereby moving outside the scope of the invention.

The invention claimed is:

1. A lifting machine comprising:
a chassis, a lifting arm that is mounted on said chassis and is moveable at least pivotingly between a high position and a low position, at least one sensor for measuring the inclination of the lifting arm in relation to the chassis, said chassis being a rolling chassis fitted with at least one front axle and one rear axle, the rear axle being mounted pivotingly about an axis parallel to the longitudinal axis of the machine, in which at least one of the axles is fitted with a suspension assembly,
wherein the pivoting rear axle is permanently free to pivot within an angular range delimited by two stops carried on said chassis, in that the front axle is coupled to the chassis by a pivot link with an axis parallel to the longitudinal axis of the machine, in that the suspension assembly is fitted to the front axle to damp the relative pivoting between the front axle and the chassis, wherein the suspension assembly of the front axle has at least one hydraulic actuator arranged between the front axle and the chassis that links the front axle to the chassis, one or more shock absorbers with at least one of which is formed by a returnable energy accumulator, and at least one closable fluid link between the actuator and the shock absorber or shock absorbers, in that said suspension assembly is an activatable/deactivatable suspension assembly, in that said suspension assembly is deactivated when the fluid link is in the closed state, in that said suspension assembly is deactivated at least when the angular value measured by the sensor for measuring the inclination of the lifting arm is greater than a predetermined threshold value, and
wherein the machine has at least one configuration in which the pivoting rear axle is free to pivot and the suspension assembly fitted to the front axle is in the activated state to enable the front axle to pivot freely.

2. The lifting machine as claimed in claim 1, wherein the machine includes a member for activating/deactivating the suspension assembly that is actuated by the driver of the machine.

3. The lifting machine as claimed in claim 1, wherein the machine includes a control unit that is configured to command the activation or deactivation of the suspension assembly at least as a function of the data provided by the sensor for measuring the inclination of the lifting arm.

4. The lifting machine as claimed in claim 1,
wherein the machine includes a member for activating/deactivating the suspension assembly that is actuated by the driver of the machine,
wherein the machine includes a control unit that is configured to command the activation or deactivation of the suspension assembly at least as a function of the data provided by the sensor for measuring the inclination of the lifting arm, and
wherein the control unit and/or the member for activating/deactivating the suspension assembly actuated by the driver of the machine are configured to command the activation of the suspension assembly by opening the fluid link and the deactivation of the suspension assembly by closing the fluid link.

5. The lifting machine as claimed in claim 1,
wherein the machine includes a control unit that is configured to command the activation or deactivation of the suspension assembly at least as a function of the data provided by the sensor for measuring the inclination of the lifting arm, and
wherein the machine includes a device for controlling the actuator comprising a member for controlling the actuator actuated by the driver of the machine and in that the control unit is configured to command the deactivation of the suspension assembly when the member for controlling the actuator actuated by the driver of the machine is in the actuated state.

6. The lifting machine as claimed in claim 5, wherein the device for controlling the actuator includes a hydraulic distributor interposed between a pressurized-fluid feed source and the actuator, said distributor being moveable between positions including at least one position in which no fluid is being fed to the actuator and positions in which fluid is fed to the actuator, said distributor being in a position feeding fluid to the actuator when the member for controlling the actuator actuated by the driver of the machine is in the actuated state.

7. The lifting machine as claimed in claim 5, wherein the chassis includes a driving cab fitted with a floor, in that the machine has a sensor for measuring the angle formed between the plane of the floor and the longitudinal axis of the front axle of the chassis and in that the control unit is configured, when the suspension assembly is in the deactivated state and the member for controlling the device for controlling the actuator is in the non-actuated state, to prevent the activation of the suspension assembly at least while the angle measured by the sensor for measuring the angle formed between the plane of the floor and the longitudinal axis of the front axle of the chassis is outside a predetermined angular range.

8. The lifting machine as claimed in claim 6, wherein the actuator is formed by a dual-action hydraulic cylinder or two single-action hydraulic cylinders, each of which is arranged between the front axle and the chassis, in that the or each cylinder of the actuator has a body and a rod that is mounted slidingly inside the body and that divides the body into two chambers, and in that the rod of the or each cylinder is free to slide inside said body of the associated cylinder when the closable fluid link between the actuator and the shock absorber or shock absorbers is in the open state.

9. The lifting machine as claimed in claim 6, wherein the or at least one shock absorber which is formed by a returnable energy accumulator, is a hydraulic or hydropneumatic accumulator, in particular a bladder- or piston- or membrane-accumulator.

10. The lifting machine as claimed in claim 3, wherein the machine has a sensor for measuring the movement speed of the machine and a sensor for measuring the steering angle of the wheels of the front axle, and in that the control unit is configured to command the deactivation of the suspension assembly at least as a function of the data provided by said sensors.

* * * * *